United States Patent
Miranda Nieto et al.

(10) Patent No.: US 10,363,880 B1
(45) Date of Patent: Jul. 30, 2019

(54) VEHICLE SEAT ASSEMBLY HAVING DEPLOYABLE HANGER

(71) Applicant: Ford Global Technologies, LLC, Dearborn, MI (US)

(72) Inventors: Jorge Adolfo Miranda Nieto, Leon (MX); Adrian Diaz Morales, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/914,205

(22) Filed: Mar. 7, 2018

(51) Int. Cl.
*B60R 7/10* (2006.01)
*B60R 7/04* (2006.01)

(52) U.S. Cl.
CPC .............. *B60R 7/10* (2013.01); *B60R 7/043* (2013.01)

(58) Field of Classification Search
CPC ............. B60R 7/10; B60R 7/042; B60R 7/08
USPC ............ 297/188.03, 188.02, 188.04, 188.05, 297/188.07, 188.09, 188.1
See application file for complete search history.

(56) References Cited

U.S. PATENT DOCUMENTS

| | | | | |
|---|---|---|---|---|
| 1,749,518 A | * | 3/1930 | Tatum | B61D 33/005 297/113 |
| 2,390,257 A | * | 12/1945 | Jahn | A47G 25/065 248/294.1 |
| 3,149,879 A | * | 9/1964 | Steiber | A47C 7/64 211/1 |
| 5,791,614 A | | 8/1998 | Sims | |
| 6,095,469 A | | 8/2000 | Von Alman | |
| 6,935,601 B2 | * | 8/2005 | Tanaka | B60R 7/02 224/282 |
| 7,255,402 B1 | * | 8/2007 | Haddad | B60N 2/76 297/411.32 |
| 7,669,821 B2 | * | 3/2010 | Martin | B60R 7/043 224/313 |
| 8,733,830 B2 | * | 5/2014 | Sanchez | B60N 2/838 297/188.03 |
| D779,845 S | * | 2/2017 | Iannazzo | D6/356 |
| 9,731,657 B1 | | 8/2017 | Salter et al. | |
| 10,065,565 B2 | * | 9/2018 | Mozurkewich | B60R 7/08 |
| 10,220,790 B2 | * | 3/2019 | Mozurkewich | B60R 7/10 |
| 2010/0156163 A1 | * | 6/2010 | Daisuke | B60N 2/686 297/452.2 |
| 2011/0095156 A1 | * | 4/2011 | Myers | B60R 7/10 248/341 |
| 2013/0015223 A1 | * | 1/2013 | Fleming | B60R 7/10 224/545 |
| 2016/0121766 A1 | * | 5/2016 | Yokoyama | B60R 7/043 297/188.14 |

FOREIGN PATENT DOCUMENTS

DE          102011112438 A1      3/2013

* cited by examiner

*Primary Examiner* — Mark R Wendell
(74) *Attorney, Agent, or Firm* — Vichit Chea; Price Heneveld LLP

(57) ABSTRACT

A vehicle seat assembly is provided that includes a seat base, a seat back coupled to the seat, and a hanger pivotally mounted to an upright side wall of the seat back. The hanger pivots forward to a use position in front of the seat back and above the seat base and pivots upward to a stowed position.

15 Claims, 3 Drawing Sheets

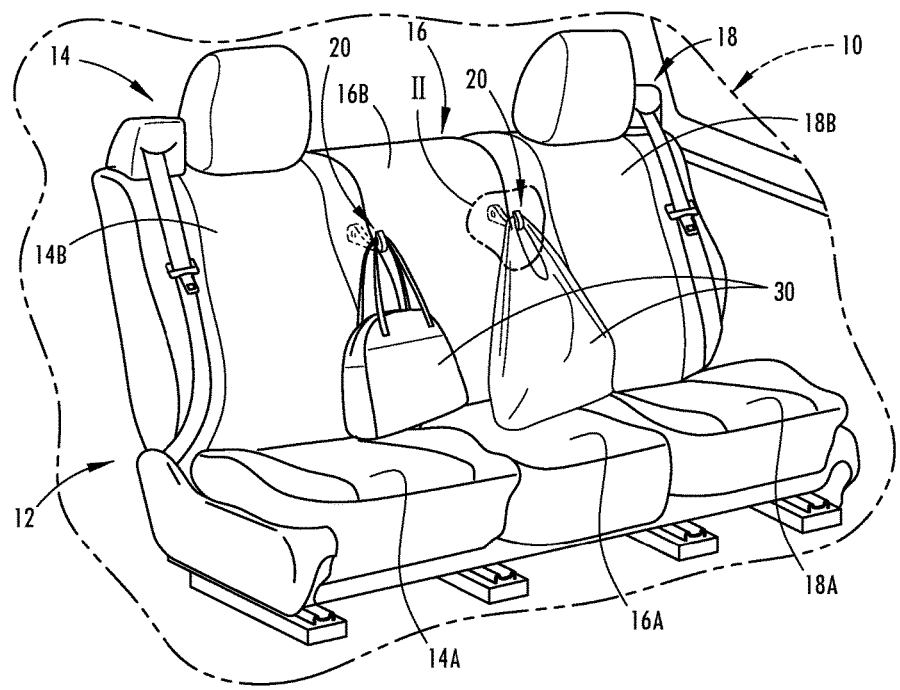
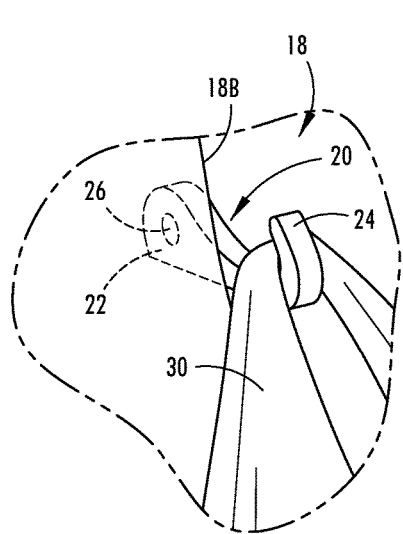
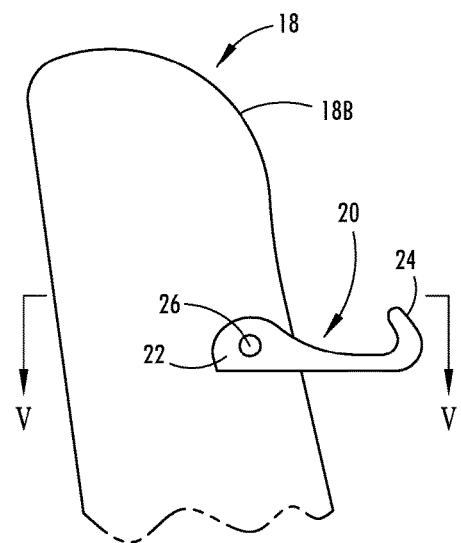
FIG. 1
FIG. 2
FIG. 2A

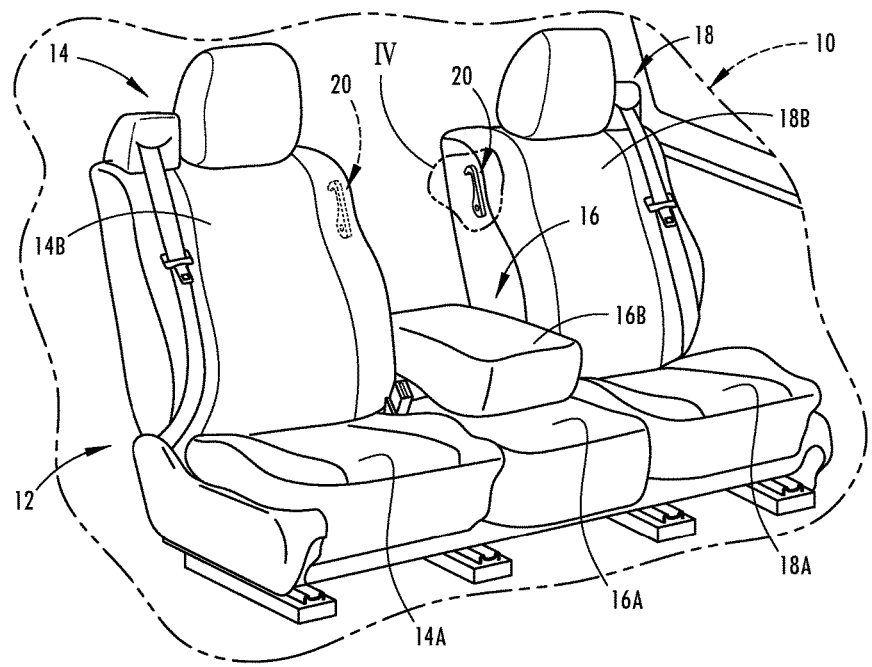
FIG. 3
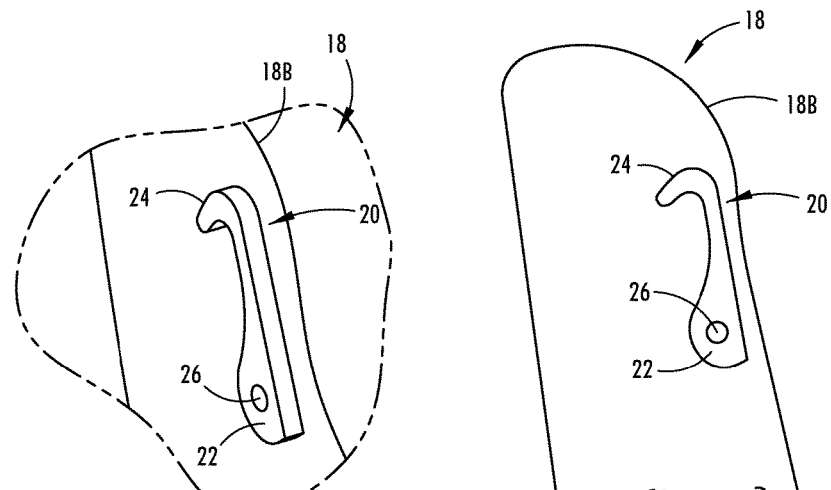
FIG. 4  FIG. 4A

VEHICLE SEAT ASSEMBLY HAVING DEPLOYABLE HANGER

FIELD OF THE INVENTION

The present invention generally relates to vehicle seat assemblies, and more particularly relates to a vehicle seat assembly having a hanger for hanging objects.

BACKGROUND OF THE INVENTION

Automotive passenger vehicles are commonly equipped with vehicle seat assemblies for seating one or more passengers. Passengers often place objects on the vehicle seat, such as grocery bags, handbags, garment bags, purses, and other objects which often are left unrestrained. Automotive vehicles are also commonly equipped with one or more garment hangers typically configured in a shape of a hook for hanging an object, such as a purse or a coat. The garment hangers may be fixedly located at various locations typically with a hook for supporting the load of an object. It may be desirable to provide for a vehicle seat that has a hanger that can hang an object, such as a purse or bag in a manner that easily accommodates the load.

SUMMARY OF THE INVENTION

According to one aspect of the present invention, a vehicle seat assembly comprises a seat base. A seat back is coupled to the seat base. A hanger is pivotally mounted to the seat back. The hanger pivots forward to a use position and pivots rearward to a stowed position.

Embodiments of the first aspect of the invention can include any one or a combination of the following features:
- the seat back comprises a first seat back located adjacent to a second seat back, wherein the hanger is pivotally connected to the first seat back and in the stowed position is disposed between the first seat back and the second seat back;
- the hanger is substantially hidden from view between the first and second seat backs when in the stowed position;
- the hanger is connected to the side wall of the seat back via a pivot pin;
- the hanger comprises a hook-shaped hanger;
- the hanger in the use position extends forward of the seat back;
- the hanger is positioned above the seat base such that an object hanging from the hanger may rest on the seat base;
- the hanger is mounted to an upright side wall of the seat back; and
- a spring biasing the hanger to the stowed position.

According to another aspect of the present invention, a vehicle seat assembly comprises a seat base. A seat back is coupled to the seat base. A hanger is pivotally mounted to an upright side wall of the seat back. The hanger pivots forward to a use position in front of the seat backward and above the seat base and pivots rearward to a stowed position along the side wall of the seat back.

Embodiments of the second aspect of the invention can include any one or a combination of the following features:
- the seat back comprises a first seat back located adjacent to a second seat back, wherein the hanger is pivotally connected to the first seat back and in the stowed position is disposed between the first seat back and the second seat back;
- the hanger is substantially hidden from view between the first and second seat backs when in the stowed position;
- the hanger is connected to the side wall of the seat back via a pivot pin;
- the hanger comprises a hook-shaped hanger;
- the hanger in the use position extends forward of the seat back; and
- the hanger is positioned above the seat base such that an object hanging from the hanger may rest on the seat base.

According to another aspect of the present invention, a vehicle seat assembly comprises a first seat base adjacent a second seat base. A first seat back is adjacent a second seat back. A hanger is pivotally mounted to the first seat back. The hanger pivots forward to a use position and pivots rearward to a stowed position between the first and second seat backs.

Embodiments of the third aspect of the invention can include any one or a combination of the following features:
- the hanger is substantially hidden from view between the first and second seat backs when in the stowed position;
- the hanger in the use position extends forward of the seat back; and
- the hanger is positioned above the first seat base such that an object hanging from the hanger may rest on the first seat base.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a front perspective view of a vehicle seat assembly with a pair of deployable hangers, according to one embodiment;

FIG. 2 is an enlarged perspective view of section II of FIG. 1 with one of the hangers in a deployed use position shown hanging an object;

FIG. 2A is a side view of the seat and hanger further illustrating the hanger in the deployed use position;

FIG. 3 is a front perspective view of the vehicle seat assembly having a middle seat back folded down and exposing the hangers shown in a non-use stowed position;

FIG. 4 is an enlarged perspective top view of section IV of FIG. 3 showing one of the hangers in the non-use stowed position;

FIG. 4A is a side view of one of the seats further illustrating the hanger in the non-use stowed position.

DETAILED DESCRIPTION OF THE PREFERRED EMBODIMENTS

Figure 5:
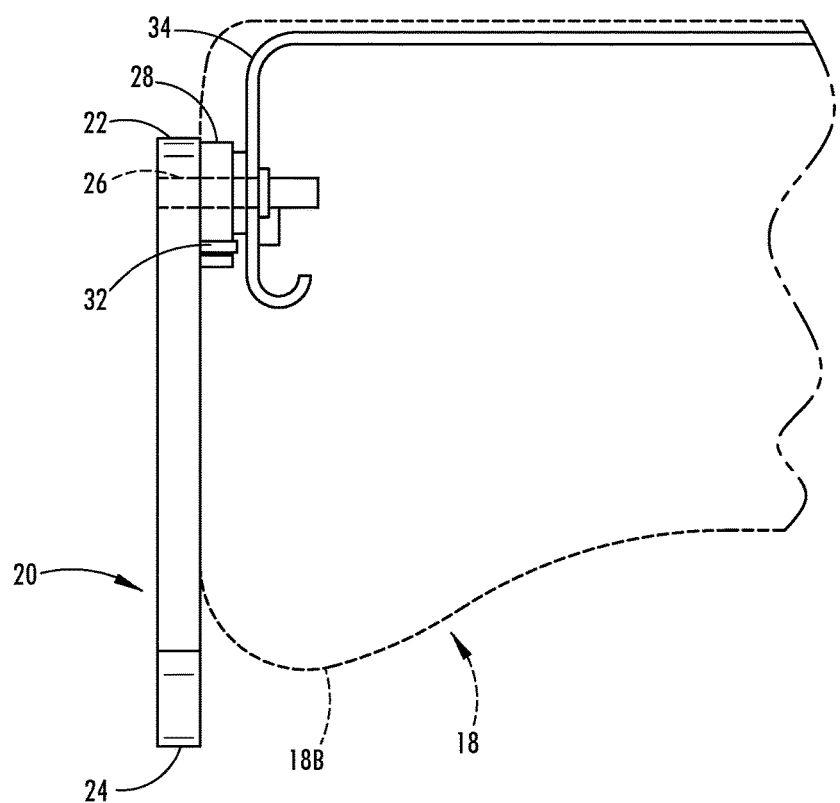
FIG. 5 is an enlarged view of a portion of the seat showing the hanger in the deployed use position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring now to FIG. 1, a vehicle 10 is generally illustrated having a vehicle seat assembly 12 generally located in the passenger compartment of the vehicle 10 and equipped with one or more deployable hangers 20, according to one embodiment. The vehicle 10 may be an automotive wheeled vehicle such as a passenger car, van, truck, bus or other vehicle equipped with one or more vehicle seat assemblies. The vehicle 10 shown has a vehicle seat assembly 12 which may be located in a rear seating row such as a second row of seats or a third row of seats located behind the front row of seats which typically includes a driver seat. The seat assembly 12 may be located in a front seating row and have a hanger 20 included extending from a non-driver (i.e., passenger) seat. The seating assembly 12 has a plurality of seats generally located side by side within the passenger compartment of the vehicle 10 for holding seated passengers. The vehicle seat assembly 12 provides a row of seats including a first seat 14, a second seat 16, and a third seat 18 located side-by-side for seating three respective passengers. The first seat 14 includes a first seat base 14A pivotally connected to a first seat back 14B. The second seat 16 includes a second seat base 16A pivotally connected to a second seat back 16B and is located between the first seat 14 and third seat 18 to serve as a middle seat. The third seat 18 includes a third seat base 18A pivotably connected to a third seat back 18B. The seat backs 14B, 16B and 18B may pivot relative to the respective seat bases 14A, 16A and 18A or may be fixed. One or more passengers may enter and exit the vehicle 10 by way of one or more doors and may be seated on any of the seats 14, 16 and 18 within the vehicle 10. In other embodiments, the row of seats may include one, two, or more than three seats.

The vehicle seat assembly 12 includes one or more deployable hangers 20 pivotally mounted to one or more of the seat backs 14B, 16B and 18B of the seats 14, 16 and 18. The deployable hangers 20 when in a deployed position as shown in FIG. 1 extend forward of the seat back from which it is mounted. As seen, the deployable hangers 20 extend forward of the seat backs 14B, 16B and 18B by a distance to allow an object to be placed on the hanger 20. Each hanger 20 when extended has a hook at or near the outer end of an arm which may receive and retain an object 30 such as a purse or bag having a handle to retain the object 30 in a fixed position. The hanger 20 is located at an elevation above the seat bases 14A, 16A and 18A to allow for the handle of the object 30 to hang from the hanger 20 and for the bottom of the object 30 to rest on the top surface of one or more of the seat bases 14A, 16A and 18A. As a result, the object 30 is retained in positon by the hanger 20 and a substantial amount of the load (e.g., weight) of the object 30 may be supported on the top surface of one or more of the seat bases 14A, 16A and 18A.

The deployable hanger 20 is further illustrated in FIGS. 2 and 2A in the deployed use position. The hanger 20 has an elongated arm 22 and is hook-shaped with an upward curved hook 24 located at the forward end thereof. One end of the arm 22 is connected to the seat back 18B and the opposite end of the arm 22 and hook 24 extend generally forward of the seat back 18B and into a position that allows for an object such as a handle or strap of a purse or a bag to be retained on the hanger 20 both while the vehicle is moving and not moving. It should be appreciated that the hanger 20 may have other shapes and sizes. For example, the hanger 20 may include a detent, notch or other retaining structure formed in the top surface of the arm 22 to receive and retain a handle or strap of a hanging object 30. In one embodiment, the arm 22 of the hanger 20 extends forward substantially horizontal. However, it should be appreciated that the angle of the arm 22 of hanger 20 may extend at other angles sufficient to retain and hold an object on the hanger 20 in the deployed use position.

The deployable hanger 20 is connected onto the upright side wall of one of the seat backs such as the seat back 18B of seat 18 such that the hanger 20 extends from the side of the seat back 18B and pivots thereon between the vertical stored position and the horizontal use position. The hanger 20 is connected to the seat back 18B via a pivot pin 26 which is fixed to arm 22 and engages a support structure within the seat back 18B. The support structure which may include a seat frame 34 that is sufficiently strong enough to support a load from an object on the hanger 20 in the deployed use position.

When the hanger 20 is in the deployed use position, the hanger 20 extends forward of the seat back as seen in FIG. 2A. A user, such as a passenger, in a vehicle may load an object 30 such as a bag having a handle or strap onto the hanger 20 as seen in FIG. 2. The object 30 will be retained in position on the hanger 20 and may rest on its bottom side on the top surface of one or more of the seat bases 14A, 16A and 18A. When the hanger 20 is not used, the hanger 20 may be pivoted about pin 26 such that the arm 22 and hook 24 rotate rearward into a non-use stowed position adjacent the side wall of the seat back 18B. The rotation of the hanger 20 from the use position rearward to the non-use stowed position may be achieved by rotating the hanger upwards and rearward or downward and rearward.

Referring to FIGS. 3-4A, the seating assembly 12 is shown with the pair of deployable hangers 20 oriented in the non-use stowed position. In the stowed position, a pair of deployable hangers 20 are oriented generally vertically along a side wall of the corresponding upright seat back 14B and 18B, respectively. The deployable hangers 20 rotate between the forward use position and the upright stored position by rotating about pivot pin 26 when the user applies force to rotate the hanger 20, according to one embodiment. In another embodiment, the deployable hangers 20 may be biased to the non-use stowed position by use of a bias spring and may be rotated forward by force applied by a user to the use position and maintained in the use position due to the load (weight) of an object overcoming the bias spring force.

As seen in FIG. 3, the deployable hangers 20 in the non-use stowed position may be exposed along the side wall of the seat backs 14B and 18B when the middle second seat back 16B is folded downward and forward to a non-seating position which may serve as a center armrest or console for the passenger seated in seats 14 and 18. When the second seat back 16B is rotated back to an upright position, the deployable hangers 20 when in the non-use stowed position may be substantially hidden from view with the exception of a front portion exposed to view in the relatively small space between the adjoining seat backs 14B and 16B and 16B and 18B. As such, a user may reach within the relatively small space between the adjacent seat backs to engage and pull the deployable hanger 20 forward to the use position and may selectively rotate the hanger 20 upright and rearward back to the hidden non-use stowed position.

Referring to FIG. 5, the deployable hanger 20 is shown from a top view with the hanger 20 in the use position extending generally forward of the seat back 18B. The pivot pin 26 supports the arm 22 at one end extending along the side of the seat back 18B. The pivot pin 26 extends further within the seat back 18B to engage a frame structure which may include a seat back frame 34. A bias spring 28 is coupled to an extension arm 32 on the hanger 20 and biases the hanger 20 to the non-use stowed position. The bias spring 28 may include a clock spring wound around the pivot pin 26, according to one embodiment. The spring 28 could otherwise be configured as a torsion spring, a coil spring or other spring bias mechanism. In an alternate embodiment, the bias spring may be omitted and the hanger 20 may be frictionally positioned on the pivot pin 26 to hold the hanger 20 via friction in either the non-use stowed or use positions during normal driving.

Accordingly, the vehicle seat assembly 12 advantageously provides for one or more deployable hangers 20 that are pivotally mounted to the seat back to pivot forward to hang one or more objects 30 forward of the seat back. The one or more hanging objects 30 may be further supported on a top surface of the seat bottom. The hanger 20 advantageously pivots between the deployed use position to hold an object and a non-use stowed position which is substantially hidden from view and out of contact with a seated passenger.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat assembly comprising:
   a seat base;
   a seat back coupled to the seat base;
   a hanger pivotally mounted to the seat back and having a retaining structure, wherein the hanger pivots forward of the seat back to a use position and pivots rearward to a stowed position; and
   a spring biasing the hanger to the stowed position.

2. The vehicle seat assembly of claim 1, wherein the seat back comprises a first seat back located adjacent to a second seat back, wherein the hanger is pivotally connected to the first seat back and in the stowed position is disposed between the first seat back and the second seat back.

3. The vehicle seat assembly of claim 2, wherein the hanger is substantially hidden from view between the first and second seat backs when in the stowed position.

4. The vehicle seat assembly of claim 1, wherein the hanger is connected to the side wall of the seat back via a pivot pin.

5. The vehicle seat assembly of claim 1, wherein the hanger comprises a hook-shaped hanger as the retaining structure.

6. The vehicle seat assembly of claim 1, wherein the hanger is positioned above the seat base such that an object hanging from the hanger may rest on the seat base.

7. The vehicle seat assembly of claim 1, wherein the hanger is mounted to an upright side wall of the seat back.

8. A vehicle seat assembly comprising:
   a seat base;

a seat back coupled to the seat base; and a hanger pivotally mounted to an upright side wall of the seat back and comprising a hook-shaped member, wherein the hanger pivots forward to a use position in front of the seat back and above the seat base and pivots rearward to a stowed position along the side wall of the seat back.

9. The vehicle seat assembly of claim 8, wherein the seat back comprises a first seat back located adjacent to a second seat back, wherein the hanger is pivotally connected to the first seat back and in the stowed position is disposed between the first seat back and the second seat back.

10. The vehicle seat assembly of claim 9, wherein the hanger is substantially hidden from view between the first and second seat backs when in the stowed position.

11. The vehicle seat assembly of claim 8, wherein the hanger is connected to the side wall of the seat back via a pivot pin.

12. The vehicle seat assembly of claim 8, wherein the hanger comprises an arm and a hook that in the use position extends forward of the seat back.

13. The vehicle seat assembly of claim 12, wherein the hanger is positioned above the seat base such that an object hanging from the hanger may rest on the seat base.

14. A vehicle seat assembly comprising:

a first seat base adjacent a second seat base;

a first seat back adjacent a second seat back; and a hanger pivotally mounted to the first seat back and having a retaining structure for hanging and retaining an object, wherein the hanger pivots forward of the seat back to a use position and pivots rearward to a stowed position between the first and second seat backs, and wherein the hanger is substantially hidden from view between the first and second seat backs when in the stowed position.

15. The vehicle seat assembly of claim 14, wherein the hanger is positioned above the first seat base such that the object hanging from the hanger may rest on the first seat base.

\* \* \* \* \*